United States Patent
Ide et al.

(10) Patent No.: US 7,609,489 B2
(45) Date of Patent: Oct. 27, 2009

(54) MAGNETIC SENSOR USING NIFE ALLOY FOR PINNED LAYER

(75) Inventors: Yosuke Ide, Niigata-ken (JP);
Masamichi Saito, Niigata-ken (JP);
Masahiko Ishizone, Niigata-ken (JP);
Naoya Hasegawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 458 days.

(21) Appl. No.: 11/366,002

(22) Filed: Feb. 28, 2006

(65) Prior Publication Data
US 2006/0198058 A1 Sep. 7, 2006

(30) Foreign Application Priority Data
Mar. 3, 2005 (JP) ............... 2005-058734

(51) Int. Cl.
*G11B 5/33* (2006.01)
(52) U.S. Cl. .................................. 360/324.11
(58) Field of Classification Search ............ 360/324.11, 360/319, 313, 324.2, 324.12, 236.5, 265.7, 360/244.2, 244.5, 244.6
See application file for complete search history.

(56) References Cited

U.S. PATENT DOCUMENTS

| 6,929,959 | B2 | | 8/2005 | Nishiyama et al. | |
| 6,970,332 | B2 | * | 11/2005 | Tetsukawa et al. | 360/324.1 |
| 7,023,204 | B2 | * | 4/2006 | Nikitin et al. | 324/210 |
| 7,035,062 | B1 | * | 4/2006 | Mao et al. | 360/324.2 |
| 7,079,362 | B2 | * | 7/2006 | Hasegawa | 360/324.12 |
| 7,150,092 | B2 | * | 12/2006 | Hasegawa | 29/603.09 |
| 7,167,391 | B2 | * | 1/2007 | Sharma et al. | 365/173 |
| 7,295,408 | B2 | * | 11/2007 | Saito et al. | 360/324.1 |
| 7,310,210 | B2 | * | 12/2007 | Miyauchi et al. | 360/324.12 |
| 2004/0075956 | A1 | * | 4/2004 | Tetsukawa et al. | 360/324.1 |

FOREIGN PATENT DOCUMENTS

| JP | 2001-338407 | 12/2001 |
| JP | 2002-204010 | 7/2002 |
| JP | 2004-247021 | 9/2004 |
| JP | 2004-288345 | 10/2004 |
| JP | 2004-318976 | 11/2004 |

* cited by examiner

*Primary Examiner*—Allen T Cao
(74) *Attorney, Agent, or Firm*—Brinks Hofer Gilson & Lione (57) ABSTRACT

A magnetic sensor comprising: a multilayer film which has a pinned magnetic layer, the magnetization thereof being pinned in one direction, and a free magnetic layer formed on the pinned magnetic layer with a nonmagnetic material layer provided therebetween, in which current is allowed to flow in a direction perpendicular to the surfaces of the layers forming the multilayer film, wherein the pinned magnetic layer has a $Ni_aFe_b$ alloy layer (where a and b each indicate atomic percent, and $0<a\leqq25$ and $a+b=100$ are satisfied).

14 Claims, 5 Drawing Sheets

MAGNETIC SENSOR USING NIFE ALLOY FOR PINNED LAYER

BACKGROUND OF THE INVENTION

1. Field of the Invention

The present invention relates to current perpendicular to the plane (hereinafter referred to as "CPP") type magnetic sensors in which a sense current is allowed to flow in a direction perpendicular to a film surface, and more particularly, relates to a magnetic sensor being able to increase $\Delta R \cdot A$, that is, the product of a change $\Delta R$ in resistance and an element area A.

2. Description of the Related Art

Figure 7:
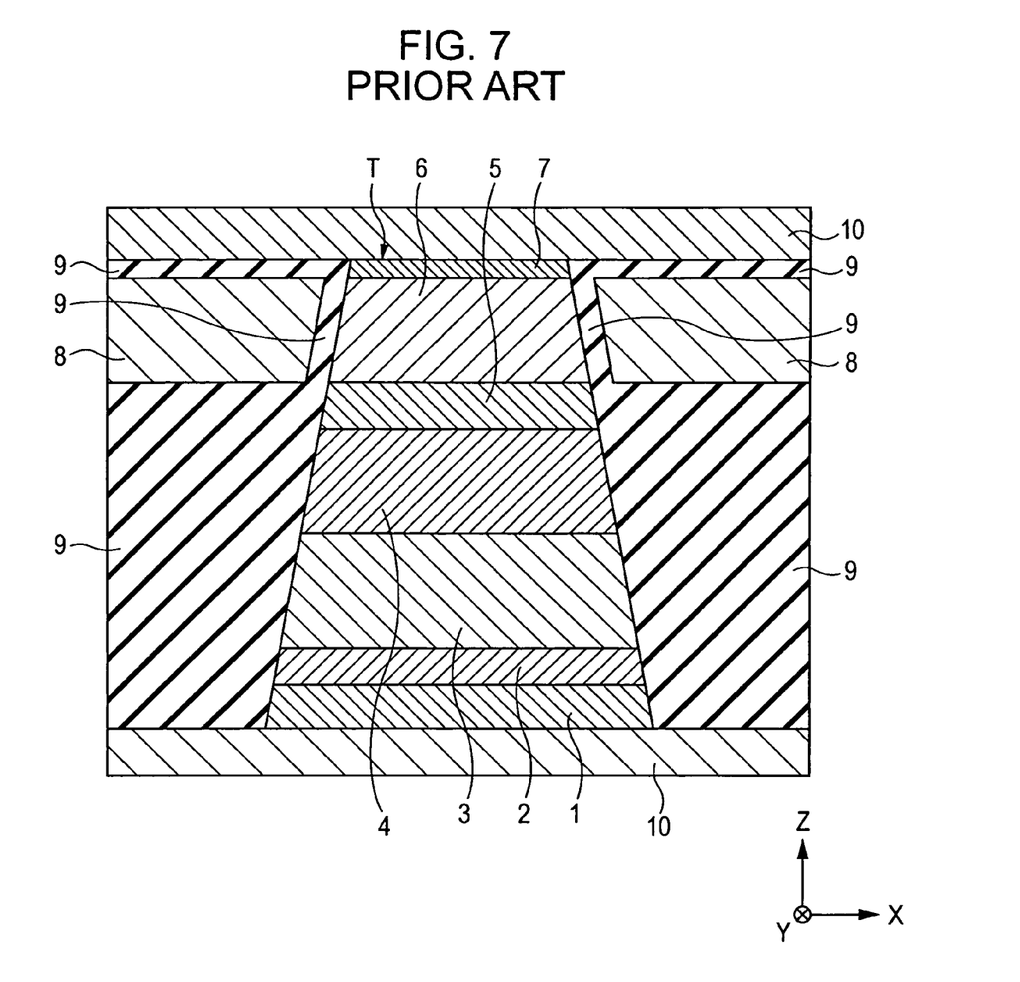
FIG. 7 is a cross-sectional view of a related magnetic sensor.

FIG. 7 is a partial cross-sectional view of a related magnetic sensor (spin valve thin film element) taken along a direction parallel to a face facing a recording medium.

Reference numeral 1 shown in FIG. 7 indicates an underlayer made of tantalum (Ta), and on the underlayer 1, a seed layer 2 made of a metal, such as chromium (Cr), having a body-centered cubic (bcc) structure is formed.

On the seed layer 2, an antiferromagnetic layer 3, a pinned magnetic layer 4, a nonmagnetic material layer 5, a free magnetic layer 6, and a protective layer 7 are successively formed in that order, thereby forming a multilayer film T.

The protective layer 7 is formed of Ta, the nonmagnetic material layer 5 is formed of copper (Cu), the free magnetic layer 6 and the pinned magnetic layer 4 are formed of a NiFe alloy, and the antiferromagnetic layer 3 is formed of PtMn.

On the top and the bottom of the multilayer film T, electrode layers 10 are provided, and a sense current is allowed to flow in a direction perpendicular to the film surface of the multilayer film.

An exchange coupling magnetic field is generated at the interface between the antiferromagnetic layer 3 and the pinned magnetic layer 4, and the magnetization of the pinned magnetic layer 4 is pinned in a height direction (Y direction in the figure).

At two sides of the free magnetic layer 6, hard bias layers 8 made of a hard magnetic material such as CoPt are formed, and the top, the bottom, and the end of each of the hard bias layers 8 are insulated by an insulating layer 9. By a longitudinal bias magnetic field applied from the hard bias layers 8, the magnetization of the free magnetic layer 6 is aligned in a track width direction (X direction in the figure).

When an exterior magnetic field is applied to the magnetic sensor shown in FIG. 7, the magnetization direction of the free magnetic layer is relatively changed with respect to that of the pinned magnetic layer, and as a result, the resistance of the multilayer film is changed. When a constant sense current flows, the exterior magnetic field is detected by detecting this change in resistance as the change in voltage.

As a material for forming the free magnetic layer and the pinned magnetic layer of a magnetic sensor, a permalloy has been often used. For example, a magnetic sensor which uses a NiFe alloy other than a permalloy for forming the free magnetic layer and the pinned magnetic layer has been disclosed in Japanese Unexamined Patent Application Publication No. 2002-204010.

The permalloy is a NiFe alloy containing 80 atomic percent of nickel (Ni). In addition, as described in paragraph (0023) of Japanese Unexamined Patent Application Publication No. 2002-204010, a $Ni_xFe_{(100-x)}$ alloy ($40 \leq x \leq 70$) is used as a high spin polarization material.

However, even when the free magnetic layer and the pinned magnetic layer are formed using a NiFe alloy having the above composition, it has been difficult to obtain a product $\Delta R \cdot A$ of 5 $m\Omega \cdot \mu m^2$ or more, $\Delta R$ and A being the change in resistance and an element area, respectively, of a CPP-GMR type magnetic sensor in which a direct sense current is allowed to flow in a direction perpendicular to a film surface of a multilayer film, and as a result, a practical reproduction output cannot be obtained.

SUMMARY OF THE INVENTION

Accordingly, the present invention was made to solve the problems described above, and an object of the present invention is to provide a magnetic sensor having a high reproduction output by forming a pinned magnetic layer having a preferable structure.

The present invention provides a magnetic sensor which comprises a multilayer film having a pinned magnetic layer, the magnetization thereof being pinned in one direction, and a free magnetic layer formed on the pinned magnetic layer with a nonmagnetic material layer provided therebetween, in which current is allowed to flow in a direction perpendicular to the surfaces of the layers forming the multilayer film. In the magnetic sensor described above, the pinned magnetic layer has a $Ni_aFe_b$ alloy layer (where a and b each indicate atomic percent, and $0<a \leq 25$ and $a+b=100$ are satisfied).

In the present invention, the pinned magnetic layer is formed so as to have a NiFe alloy layer. However, the content of Ni and that of iron (Fe) on an atomic percent basis in the NiFe alloy are different from those of an alloy used in the past. That is, in the present invention, the content of Ni in the NiFe alloy is small, such as in the range of more than 0 to 25 atomic percent. The inventor of the present invention discovered that when the content of Ni in the NiFe alloy is in the range described above, a product $\Delta R \cdot A$, that is, the product of the change in resistance and an element area of the magnetic sensor can be increased as compared to that in the past. In addition, in the magnetic sensor of the present invention, the magnetostrictive constant of the pinned magnetic layer can be increased, and hence the uniaxial anisotropy thereof can be increased.

In the present invention, the pinned magnetic layer preferably has a $Ni_aFe_b$ alloy layer (where a and b each indicate atomic percent, and $4 \leq a \leq 23$ and $a+b=100$ are satisfied). Furthermore, the pinned magnetic layer more preferably has a $Ni_aFe_b$ alloy layer (where a and b each indicate atomic percent, and $15 \leq a \leq 20$ and $a+b=100$ are satisfied).

In the present invention, the pinned magnetic layer preferably has a three-layered structure in which two CoFe layers are provided on the top and the bottom of the $Ni_aFe_b$ alloy layer described above.

In addition, the free magnetic layer preferably has a $Co_2YZ$ alloy layer (where Y indicates at least one element selected from the group consisting of Mn, Fe, and Cr, and Z indicates at least one element selected from the group consisting of Al, Ga, Si, Ge, Sn, In, Sb, Pb, and Zn).

In the present invention, the product $\Delta R \cdot A$ can be set to 5 $m\Omega \cdot \mu m_2$ or more, $\Delta R$ being the change in resistance and A being the element area.

The magnetic sensor of the present invention may be a top spin valve CPP-GMR type magnetic sensor in which the pinned magnetic layer is provided at an upper side of the free magnetic layer.

Alternatively, the magnetic sensor of the present invention may be a bottom spin valve CPP-GMR type magnetic sensor in which the pinned magnetic layer is provided at a lower side of the free magnetic layer.

The magnetic sensor of the present invention may be a dual spin valve CPP-GMR type magnetic sensor in which the nonmagnetic material layer and the pinned magnetic layer are provided under the free magnetic layer, and another nonmagnetic material layer and another pinned magnetic layer are also provided on the free magnetic layer.

For example, the magnetization direction of the pinned magnetic layer may be pinned by providing an antiferromagnetic layer on the pinned magnetic layer.

In addition, the magnetic sensor of the present invention may be a magnetic sensor having a self-pinned structure in which the magnetization of the pinned magnetic layer is pinned in one direction by the uniaxial anisotropy thereof.

In the present invention, when the content of Ni in the NiFe alloy of the pinned magnetic layer is set small, such as in the range of more than 0 to 25 atomic percent, the product $\Delta R \cdot A$, that is, the product of the change in resistance and the element area of the magnetic sensor can be increased. In addition, the magnetostrictive constant of the pinned magnetic layer can be increased, and hence the uniaxial anisotropy thereof can be increased.

DESCRIPTION OF THE PREFERRED EMBODIMENTS

Figure 1:
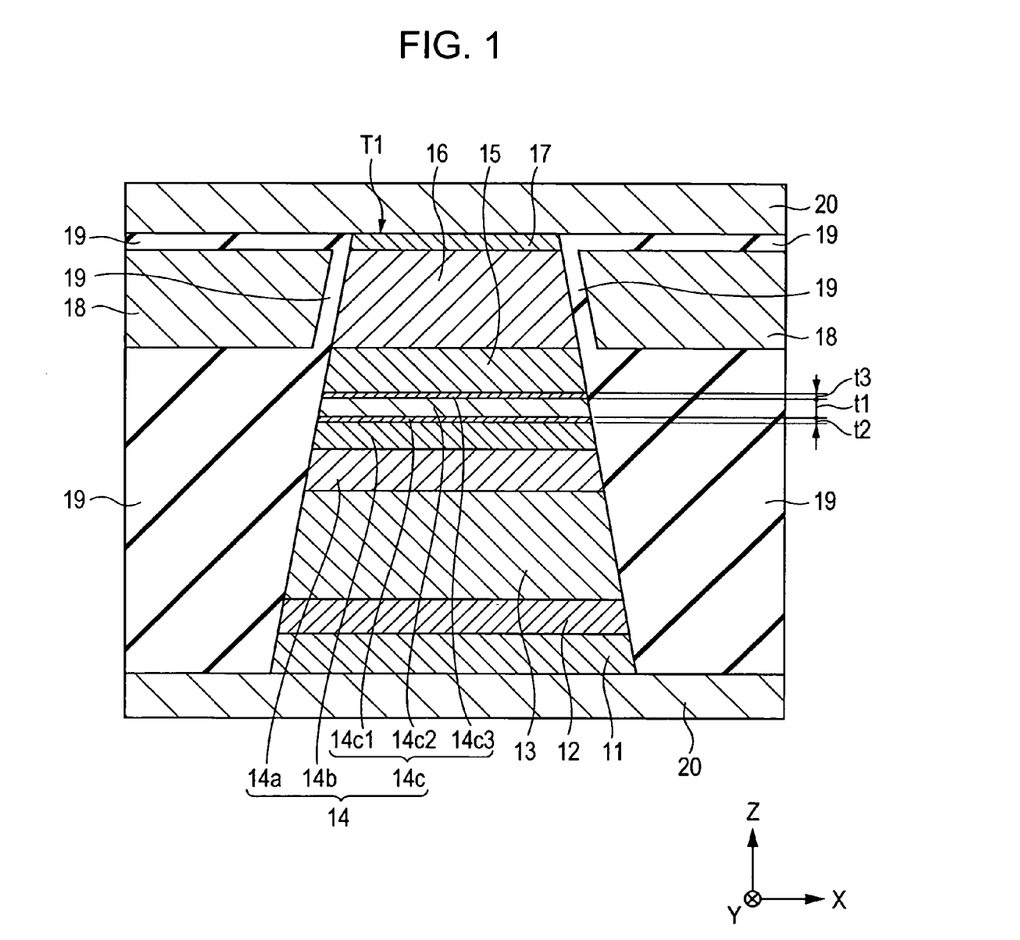
FIG. 1 is a cross-sectional view showing the structure of a magnetic sensor (single spin valve magnetoresistive effect element) according to a first embodiment of the present invention, the sensor being viewed from a face facing a recording medium.

FIG. 1 is a cross-sectional view of a whole structure of a magnetic sensor (single spin valve magnetoresistive effect element) according to a first embodiment of the present invention, the sensor being viewed from a face facing a recording medium. The cross-sectional view in FIG. 1 shows only a central portion of the magnetic sensor extending in an X direction.

This single spin valve magnetoresistive effect element is provided, for example, at a trailing side end portion of a floating type slider of a hard disc device and detects a recording magnetic field of a hard disc or the like. In this embodiment, the traveling direction of a magnetic recording medium such as a hard disc is a Z direction, and the direction of a leakage magnetic field from the magnetic recording medium is a Y direction.

An underlayer 11 is formed at the lowest position in FIG. 1 which is composed of a nonmagnetic material containing at least one element such as Ta, hafnium (Hf), niobium (Nb), zirconium (Zr), titanium (Ti), molybdenum (Mo), and tungsten (W). On this underlayer 11, a seed layer 12, an antiferromagnetic layer 13, a pinned magnetic layer 14, a nonmagnetic material layer 15, a free magnetic layer 16, and a protective layer 17 are formed in that order from the bottom, so that a multilayer film T1 is formed. The magnetic sensor shown in FIG. 1 is a so-called bottom spin valve GMR magnetic sensor in which the antiferromagnetic layer 13 is provided under the free magnetic layer 16.

The seed layer 12 is formed of NiFeCr or Cr, and when being formed of NiFeCr, the seed layer 12 has a face-centered cubic (fcc) structure in which equivalent crystal planes represented by the {111} planes are preferentially oriented in a direction parallel to the film surface. In addition, when being formed of Cr, the seed layer 12 has a body-centered cubic (bcc) structure in which equivalent crystal planes represented by the {110} planes are preferentially oriented in the direction parallel to the film surface.

The underlayer 11 has a structure similar to that of an amorphous material; however, it may not always be formed.

The antiferromagnetic layer 13 provided on the seed layer 12 is preferably formed of an antiferromagnetic material containing manganese (Mn) and an element X (where the element X is at least one element selected from the group consisting of platinum (Pt), palladium (Pd), iridium (Ir), rhodium (Rh), ruthenium (Ru), and osmium (Os)).

The antiferromagnetic layer 13 has either a face-centered cubic (fcc) structure or a face-centered tetragonal (fct) structure.

The X-Mn alloy using a platinum group element has various superior features: for example, corrosion resistance is superior, a blocking temperature is high, and an exchange coupling magnetic field (Hex) can be increased. For example, a PtMn alloy or an IrMn alloy, which is formed of two elements, may be used.

In addition, in the present invention, the antiferromagnetic layer 13 may be formed of an antiferromagnetic material containing Mn, the element X, and an element X' (where the element X' is at least one element selected from the group consisting of neon (Ne), argon (Ar), krypton (Kr), xenon (Xe), beryllium (Be), boron (B), carbon (C), nitrogen (N), magnesium (Mg), aluminum (Al), silicon (Si), phosphorus (P), Ti, vanadium (V), Cr, Fe, cobalt (Co), Ni, Cu, zinc (Zn), gallium (Ga), germanium (Ge), Zr, Nb, Mo, solver (Ag), cadmium (Cd), tin (Sn), Hf, Ta, W, rhenium (Re), gold (Au), lead (Pb) and a rare earth element).

As the element X', an element is preferably used which intervenes into interstices of a space lattice formed of the element X and Mn or which substitutes for some of lattice points of a crystal lattice formed of the element X and Mn. In this embodiment, a solid solution indicates a solid in which components are uniformly mixed with each other in a wide composition range.

In the present invention, the composition of the element X' is preferably in the range of 0.2 to 10 atomic percent and more preferably in the range of 0.5 to 5 atomic percent. In addition, in the present invention, the element X is preferably Pt or Ir.

In addition, in the present invention, the composition of the element X' or the total of the elements X and X' is preferably set in the range of 45 to 60 atomic percent and more preferably in the range of 49 to 56.5 atomic percent. Accordingly, in a film forming step, it is estimated that the interface with the pinned magnetic layer 14 is placed in a non-aligned state, and in addition, that an appropriate order transformation occurs in the antiferromagnetic layer 13 by heat treatment.

The pinned magnetic layer 14 is formed of a magnetic layer 14a, a nonmagnetic interlayer 14b, and a magnetic layer 14c. The magnetization direction of the magnetic layer 14a and that of the magnetic layer 14c are antiparallel to each other by an exchange coupling magnetic field at the interface with the antiferromagnetic layer 13 and an antiferromagnetic exchange coupling magnetic field (RKKY interaction) between the magnetic layers 14a and 14c with the nonmagnetic interlayer 14b provided therebetween. This is a so-called artificial ferrimagnetic coupling state; hence, by this structure, the magnetization of the pinned magnetic layer 14 can be placed in a stable state, and an apparent exchange coupling magnetic field generated at the interface between the pinned magnetic layer 14 and the antiferromagnetic layer 13 can be increased.

For example, the magnetic layer 14a is formed to have a thickness of approximately 15 to 35 Å, the nonmagnetic interlayer 14b is formed to have a thickness of approximately 8 to 10 Å, and the magnetic layer 14c is formed to have a thickness of approximately 20 to 50 Å.

The magnetic layer 14a is formed of a CoFe alloy. The nonmagnetic interlayer 14b is formed of a nonmagnetic conductive material such as Ru, Rh, Ir, Cr, Re, and Cu. The magnetic layer 14c has a three-layered structure formed of a CoFe alloy layer 14c1, a $Ni_aFe_b$ alloy layer 14c2, and a CoFe alloy layer 14c3.

The nonmagnetic material layer 15 provided on the pinned magnetic layer 14 is formed of Cu, Au, or Ag.

Furthermore, the free magnetic layer 16 is formed. The free magnetic layer 16 is preferably a $Co_2YZ$ alloy layer (Y is at least one element selected from the group consisting of Mn, Fe, and Cr, and Z is at least one element selected from the group consisting of Al, Ga, Si, Ge, Sn, In, Sb, Pb, and Zn). The $CO_2YZ$ alloy layer has properties similar to those of a half metal and is an effective material to increase a product $\Delta R \cdot A$ of a CPP-GMR magnetic sensor, $\Delta R$ being the change in resistance and A being an element area of the sensor. More preferably, the free magnetic layer 16 is formed of a metal compound having a composition represented by $CO_2MnZ$. In this case, Z is at least one element selected from the group consisting of Al, Ga, Si, Ge, Sn, In, Sb, Pb, and Zn.

In the embodiment shown in FIG. 1, hard bias layers 18 are formed at two sides of the free magnetic layer 16. By a longitudinal magnetic field from the hard bias layers 18, the magnetization of the free magnetic layer 16 is aligned in a track width direction (X direction in the figure). The hard bias layers 18 are each formed, for example, of a Co—Pt alloy or a Co—Cr—Pt alloy.

The top, the bottom and the end portion of each of the hard bias layers 18 are insulated by a corresponding insulating layer 19.

On the top and the bottom of the multilayer film T1, electrode layers 20 are provided, so that a CPP-GMR magnetic sensor is formed in which a sense current is allowed to flow in a direction perpendicular to the surfaces of the layers forming the multilayer film T1. The electrode layers 20 are each formed of α-Ta, Au, Cr, Cu, Rh, Ir, Ru, W or the like.

Next, characteristic portions of this embodiment will be described.

The magnetic layer 14c of the pinned magnetic layer 14 has a three-layered structure formed of the CoFe layer 14c1, the $Ni_aFe_b$ alloy layer 14c2 (where a and b each indicate atomic percent, and $0<a\leq25$ and $a+b=100$ are satisfied), and the CoFe layer 14c3 laminated in that order from the bottom.

According to this embodiment, the content of Ni in the NiFe alloy forming the $Ni_aFe_b$ alloy layer 14c2 is set small, such as in the range of more than 0 to 25 atomic percent. When the content of Ni in the NiFe alloy is in the range as described above, the product $\Delta R \cdot A$ of the change in resistance and the element area of the magnetic sensor can be increased as compared to that of a related magnetic sensor. In addition, when the content of Ni in the NiFe alloy is in the range described above, the magnetostrictive constant of the pinned magnetic layer 14 can be increased, and hence the uniaxial anisotropy thereof can be increased.

In addition, the $Ni_aFe_b$ alloy layer 14c2 is preferably formed of a $Ni_aFe_b$ alloy (where a and b each indicate atomic percent, and $4\leq a\leq23$ and $a+b=100$ are satisfied) and is more preferably formed of a $Ni_aFe_b$ alloy (where a and b each indicate atomic percent, and $15\leq a\leq20$ and $a+b=100$ are satisfied). The CoFe layer 14c1 and the CoFe layer 14c3 formed on the top and the bottom of the $Ni_aFe_b$ alloy layer 14c2 are provided in order to prevent the diffusion of the NiFe alloy. In the case of the single spin valve GMR magnetic sensor shown in FIG. 1, when the CoFe layer 14c3 in contact with the nonmagnetic material layer 15 is only provided, the diffusion of the NiFe alloy to the nonmagnetic material layer 15 can be effectively prevented. In addition, a single layer structure may be formed only by the $Ni_aFe_b$ alloy layer 14c2 without the CoFe layers 14c1 and 14c3.

In addition, a thickness t1 of the $Ni_aFe_b$ alloy layer 14c2 is preferably in the range of 15 to 50 Å, and a thickness t2 of the CoFe layer 14c1 and a thickness t3 of the CoFe layer 14c3 are each preferably in the range of 5 to 15 Å.

In the spin valve thin film element shown in FIG. 1, after the layers from the underlayer 11 to the protective layer 17 are formed by a sputtering method or a deposition method, heat treatment is performed, thereby generating the exchange coupling magnetic field at the interface between the antiferromagnetic layer 13 and the pinned magnetic layer 14. In this step, when the magnetic field is aligned in a direction parallel to the Y direction in the figure, the magnetization of the pinned magnetic layer 14 is pinned in the direction parallel to the Y direction in the figure. In the embodiment shown in FIG. 1, since the pinned magnetic layer 14 has an artificial ferrimagnetic structure, when the magnetic layer 14a is magnetized in the Y direction in the figure, the magnetic layer 14c is magnetized in a direction opposite to the Y direction in the figure.

In the magnetic sensor shown in FIG. 1, the magnetization of the pinned magnetic layer and that of the free magnetic layer are perpendicular to each other. When a leakage magnetic field from a recording medium enters the magnetic sensor along the Y direction in the figure, the magnetization of the free magnetic layer is sensitively changed, and by the relationship between this change in magnetization direction and the pinned magnetization direction of the pinned magnetic layer, the electric resistance is changed; hence, by the change in voltage or the change in current caused by this change in electric resistance, the leakage magnetic field from the recording medium is detected.

Figure 2:
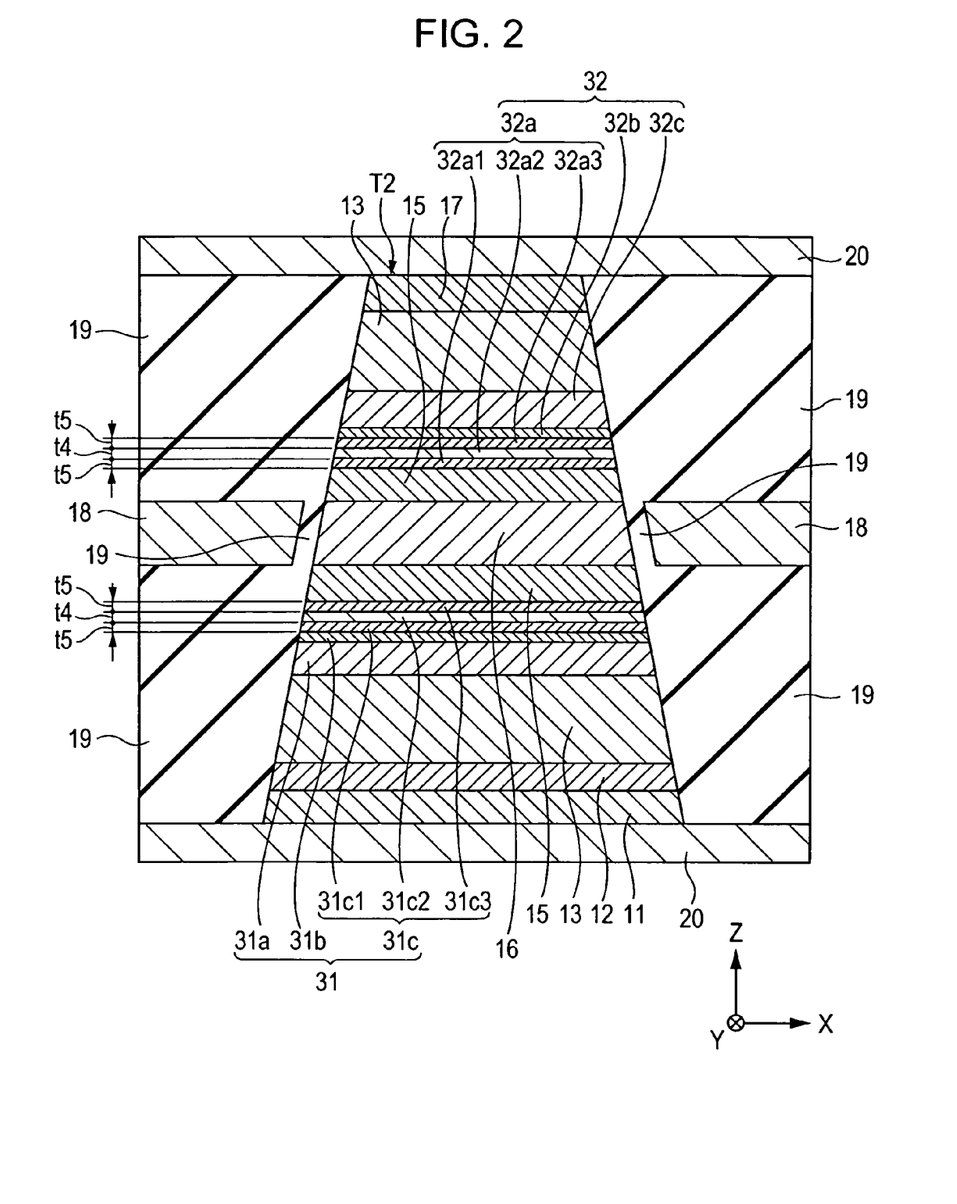
FIG. 2 is a cross-sectional view showing the structure of a magnetic sensor (dual spin valve magnetoresistive effect element) according to a second embodiment of the present invention, the sensor being viewed from a face facing a recording medium.

FIG. 2 is a cross-sectional view of a dual spin valve magnetic sensor of the present invention, the sensor being viewed from a face facing a recording medium.

As shown in FIG. 2, the underlayer 11, the seed layer 12, the antiferromagnetic layer 13, a pinned magnetic layer 31, the nonmagnetic material layer 15, and the free magnetic layer 16 are successively formed in that order from the bottom. In addition, on the free magnetic layer 16, the nonmagnetic material layer 15, a pinned magnetic layer 32, the antiferromagnetic layer 13, and the protective layer 17 are successively formed in that order, so that a multilayer film T2 is formed.

In addition, at two sides of the free magnetic layer 16, the hard bias layers 18 are provided. The hard bias layers 18 are insulated by the respective insulating layers 19 each formed of alumina or the like.

On the top and the bottom of the multilayer film T2, the electrode layers 20 are provided, so that a CPP-GMR magnetic sensor is formed in which a sense current is allowed to flow in a direction perpendicular to the surfaces of the layers forming the multilayer film T2.

In FIG. 2, the layers designated by the same reference numerals as those shown in FIG. 1 are each formed of the same material as described above.

The pinned magnetic layer 31 of the magnetic sensor shown in FIG. 2 is composed of a magnetic layer 31a, a nonmagnetic interlayer 31b, and a magnetic layer 31c. The magnetic layer 31a is formed of a ferromagnetic material such as CoFe. The nonmagnetic interlayer 31b is formed of a nonmagnetic conductive material such as Ru, Rh, Ir, Cr, Re, or Cu. The magnetic layer 31c has a three-layered structure formed of a CoFe alloy layer 31c1, a $Ni_aFe_b$ alloy layer 31c2, and a CoFe alloy layer 31c3.

The magnetization direction of the magnetic layer 31a and that of the magnetic layer 31c are antiparallel to each other by an exchange coupling magnetic field at the interface with the antiferromagnetic layer 13 and an antiferromagnetic exchange coupling magnetic field between the magnetic layers 31a and 31c with the nonmagnetic interlayer 31b provided therebetween.

The pinned magnetic layer 32 shown in FIG. 2 is composed of a magnetic layer 32a, a nonmagnetic interlayer 32b, and a magnetic layer 32c. The magnetic layer 32c is formed of a ferromagnetic material such as CoFe, and the nonmagnetic interlayer 32b is formed of the same nonmagnetic material as that forming the nonmagnetic interlayer 31b. The magnetic layer 32a has a three-layered structure composed of a CoFe alloy layer 32a1, a $Ni_aFe_b$ alloy layer 32a2, and a CoFe alloy layer 32a3. The magnetization direction of the magnetic layer 32c and that of the magnetic layer 32a are antiparallel to each other by an exchange coupling magnetic field at the interface with the antiferromagnetic layer 13 provided on the pinned magnetic layer 32 and an antiferromagnetic exchange coupling magnetic field (RKKY interaction) between the magnetic layers 32a and 32c with the nonmagnetic interlayer 32b provided therebetween.

In addition, the pinned magnetic layers 31 and 32 may only be formed of the magnetic layer 31c and the magnetic layer 32a, respectively, so as not to have an artificial ferrimagnetic structure. Also in this embodiment, the contents of Ni in the NiFe alloys forming the $Ni_aFe_b$ alloy layers 31c2 and 32a2 are set small, such as in the range of more than 0 to 25 atomic percent. When the content of Ni in the NiFe alloy is in the range as described above, the product ΔR·A of the change in resistance and the element area of the magnetic sensor can be increased as compared to that of a related magnetic sensor. In addition, when the content of Ni in the NiFe alloy is in the range described above, the magnetostrictive constants of the pinned magnetic layers 31 and 32 can be increased, and hence the uniaxial anisotropies thereof can be increased.

The CoFe layers 31c1 and 31c3 provided on the top and the bottom of the $Ni_aFe_b$ alloy layer 31c2 and the CoFe layers 32a1 and 32a3 provided on the top and the bottom of the $Ni_aFe_b$ alloy layer 32a2 are formed to prevent the diffusion of the NiFe alloys. In addition, only the $Ni_aFe_b$ alloy layer 31c2 and the $Ni_aFe_b$ alloy layer 32a2 may be formed without forming the CoFe layers 31c1 and 31c3 and the CoFe layers 32a1 and 32a3.

Thicknesses t4 of the $Ni_aFe_b$ alloy layers 31c2 and 32a2 are preferably in the range of 15 to 50 Å, and thicknesses t5 of the CoFe layers 31c1 and 31c3 and the CoFe layers 32a1 and 32a3 are preferably in the range of 5 to 15 Å.

In the spin valve thin film element shown in FIG. 2, after the layers from the underlayer 11 to the protective layer 17 are formed by a sputtering method or a deposition method, heat treatment is performed, thereby generating the exchange coupling magnetic field at the interface between the antiferromagnetic layer 13 and the pinned magnetic layer 31 and the exchange coupling magnetic field at the interface between the antiferromagnetic layer 13 and the pinned magnetic layer 32. In this step, when the magnetic field is aligned in the direction parallel to the Y direction in the figure, the magnetizations of the pinned magnetic layer 31 and 32 are pinned in the direction parallel to the Y direction in the figure. In the embodiment shown in FIG. 2, the pinned magnetic layers 31 and 32 each have an artificial ferrimagnetic structure.

In the magnetic sensor shown in FIG. 2, the magnetizations of the pinned magnetic layers and the magnetization of the free magnetic layer are perpendicular to each other. When a leakage magnetic field from a recording medium enters the magnetic sensor along the Y direction in the figure, the magnetization of the free magnetic layer is sensitively changed, and by the relationship between this change in magnetization direction and the pinned magnetization directions of the pinned magnetic layers, the electric resistance is changed; hence, by the change in voltage or the change in current caused by this change in electric resistance, the leakage magnetic field from the recording medium is detected. In the dual spin valve magnetic sensor shown in FIG. 2, since the pinned magnetic layers 32 and 31 are provided on the top and the bottom of the free magnetic layer 16 with the nonmagnetic material layers 15 provided therebetween, the product ΔR·A of the change in resistance and the element area can be increased by twice that of the single spin valve magnetic sensor shown in FIG. 1 from a theoretical point of view. According to the magnetic sensor of this embodiment, the ΔR·A thereof can be increased to 5 mΩ·μm² or more.

In addition, when the $Ni_aFe_b$ alloy layers 31c2 and 32a2 are each formed of a $Ni_aFe_b$ alloy (where a and b each indicate atomic percent, and 4≦a≦23 and a+b=100 are satisfied), the ΔR·A of the magnetic sensor can be increased to 5.5 mΩ·μm² or more. Furthermore, when the $Ni_aFe_b$ alloy layers 31c2 and 32a2 are each formed of a $Ni_aFe_b$ alloy (where a and b each indicate atomic percent, and 15≦a≦20 and a+b=100 are satisfied), the ΔR·A of the magnetic sensor can be increased to 6 mΩ·μm² or more.

Figure 3:
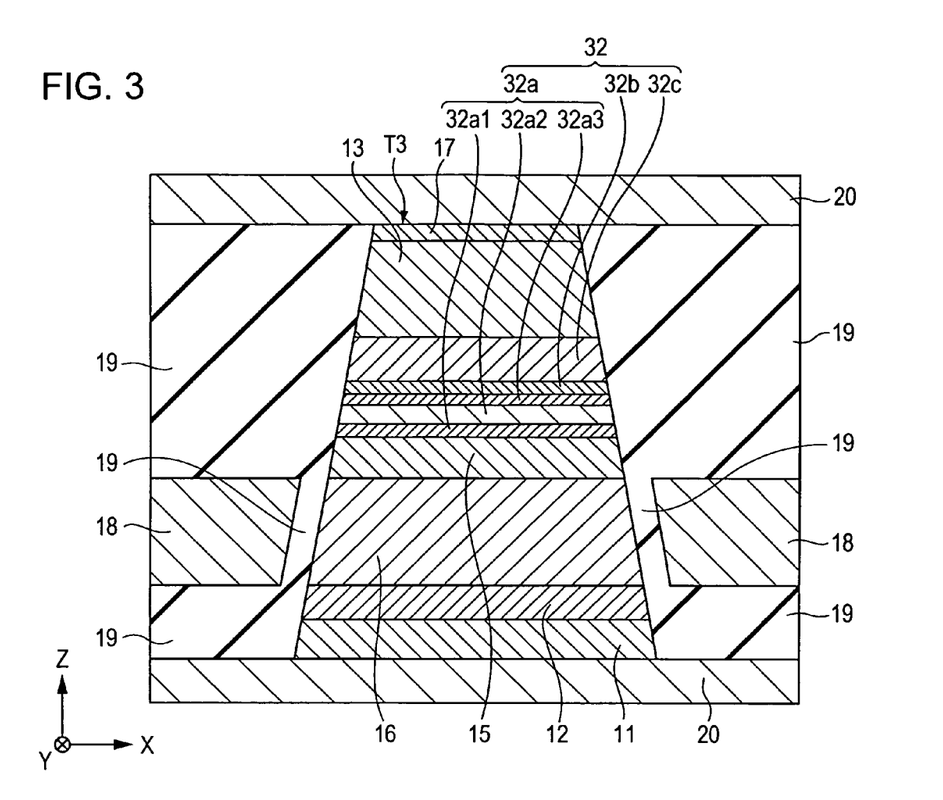
FIG. 3 is a cross-sectional view showing the structure of a magnetic sensor (single spin valve magnetoresistive effect element) according to a third embodiment of the present invention, the sensor being viewed from a face facing a recording medium.

FIG. 3 is a cross-sectional view of a top spin valve magnetic sensor of the present invention, the sensor being viewed from a face facing a recording medium.

As shown in FIG. 3, the underlayer 11, the seed layer 12, the free magnetic layer 16, the nonmagnetic material layer 15, the pinned magnetic layer 32, the antiferromagnetic layer 13, and the protective layer 17 are successively formed in that order from the bottom, so that a multilayer film T3 is formed.

In addition, at two sides of the free magnetic layer 16, the hard bias layers 18 are provided. The hard bias layers 18 are insulated by the respective insulating layers 19 each formed of alumina or the like.

On the top and the bottom of the multilayer film T3, the electrode layers 20 are provided, so that a CPP-GMR magnetic sensor is formed in which a sense current is allowed to flow in a direction perpendicular to the surfaces of the layers forming the multilayer film T3.

In FIG. 3, the layers designated by the same reference numerals as that shown in FIGS. 1 and 2 are each formed of the same material as described above.

Also in this embodiment, the content of Ni in the NiFe alloy forming the $Ni_aFe_b$ alloy layer 32a2 is set small, such as in the range of more than 0 to 25 atomic percent. When the content of Ni in the NiFe alloy is in the range as described above, the product ΔR·A of the change in resistance and the element area of the magnetic sensor can be increased as compared to that of a related magnetic sensor. In addition, when the content of Ni is in the range described above, the magnetostrictive constant of the pinned magnetic layer 32 can be increased, and hence the uniaxial anisotropy thereof can be increased.

In addition, the $Ni_aFe_b$ alloy layer 32a2 is preferably formed of a $Ni_aFe_b$ alloy (where a and b each indicate atomic percent, and $4 \leq a \leq 23$ and a+b=100 are satisfied). Furthermore, the $Ni_aFe_b$ alloy layer 32a2 is more preferably formed of a $Ni_aFe_b$ alloy (where a and b each indicate atomic percent, and $15 \leq a \leq 20$ and a+b=100 are satisfied).

In FIGS. 1 to 3, the magnetization directions of the pinned magnetic layers 14, 31, and 32 are each pinned by the exchange coupling magnetic field at the interface with the antiferromagnetic layer 13. However, a pinned magnetic layer having a self-pinned structure may be formed in which the antiferromagnetic layer 13 is not provided on the pinned magnetic layers 14, 31, and 32 and in which the magnetization directions of the pinned magnetic layers 14, 31, and 32 are pinned by their own uniaxial anisotropies.

Figure 4:
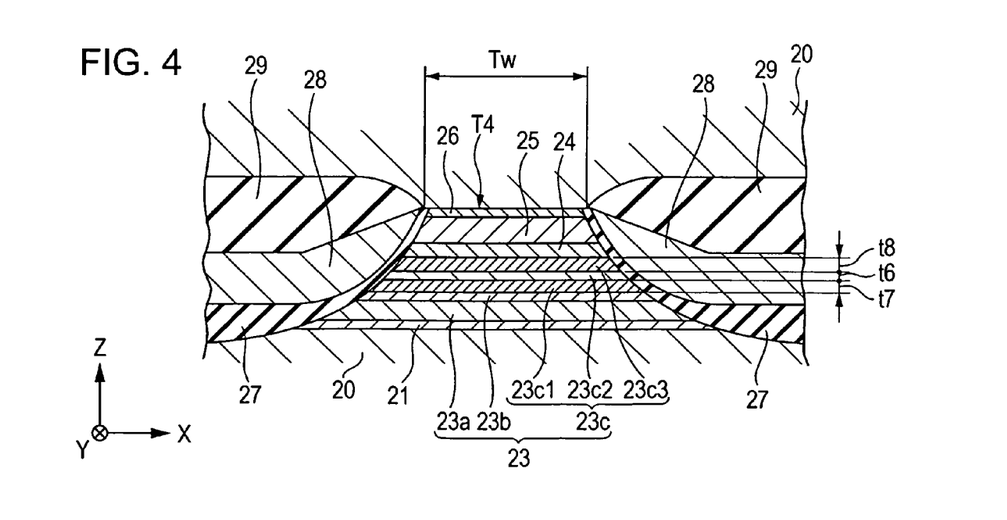
FIG. 4 is a cross-sectional view showing the structure of a magnetic sensor (self-pinned type single spin valve magnetoresistive effect element) according to a fourth embodiment of the present invention, the sensor being viewed from a face facing a recording medium.

FIG. 4 is a cross-sectional view of a magnetic sensor having a self-pinned type pinned magnetic layer, the sensor being viewed from a face facing a recording medium.

In the embodiment shown in FIG. 4, a seed layer 21, a pinned magnetic layer 23, a nonmagnetic material layer 24, a free magnetic layer 25, and a protective layer 26 are successively formed in that order from the bottom, so that a multilayer film T4 is formed.

The seed layer 21 is formed of a NiFe alloy, a NiFeCr alloy, Cr, or Ta. The seed layer 21 is formed, for example, of $(Ni_{0.8}Fe_{0.2})_{60\ atm\ \%}Cr_{40\ atm\ \%}$ having a thickness of 35 to 60 Å.

The pinned magnetic layer 23 is formed of a magnetic layer 23a, a nonmagnetic interlayer 23b, and a magnetic layer 23c. The magnetization direction of the magnetic layer 23a and that of the magnetic layer 23c are antiparallel to each other by an antiferromagnetic exchange coupling magnetic field (RKKY interaction) between the magnetic layers 23a and 23c with the nonmagnetic interlayer 23b provided therebetween. This is a so-called artificial ferrimagnetic coupling state; hence, by this structure, the magnetization of this pinned magnetic layer 23 can be placed in a stable state. The magnetization direction of the pinned magnetic layer 23 is pinned in the direction parallel to the Y direction (height direction) in the figure by the uniaxial anisotropies of the magnetic layers 23a and 23c. This structure of the pinned magnetic layer is called a self-pinned structure.

For example, the magnetic layer 23a is formed to have a thickness of approximately 15 to 35 Å, the nonmagnetic interlayer 23b is formed to have a thickness of approximately 8 to 10 Å, and the magnetic layer 23c is formed to have a thickness of approximately 20 to 50 Å.

The magnetic layer 23a is formed of a CoFe alloy. The nonmagnetic interlayer 23b is formed of a nonmagnetic conductive material such as Ru, Rh, Ir, Cr, Re, and Cu. The magnetic layer 23c has a three-layered structure formed of a CoFe alloy layer 23c1, a $Ni_aFe_b$ alloy layer 23c2, and a CoFe alloy layer 23c3. Since being the feature of the present invention, the composition of the $Ni_aFe_b$ alloy layer 23c2 will be described later in detail.

The nonmagnetic material layer 24 is a layer for preventing magnetic coupling between the pinned magnetic layer 23 and the free magnetic layer 25 and is preferably formed of a nonmagnetic conductive material such as Cu, Cr, Au, or Ag. In particular, the nonmagnetic material layer 24 is preferably formed of Cu, and the thickness thereof is in the range of 17 to 50 Å.

Furthermore, the free magnetic layer 25 is formed. The free magnetic layer 25 is preferably a $CO_2YZ$ alloy layer (where Y is at least one element selected from the group consisting of Mn, Fe, and Cr, and Z is at least one element selected from the group consisting of Al, Ga, Si, Ge, Sn, In, Sb, Pb, and Zn). The $CO_2YZ$ alloy layer has properties similar to those of a half metal and is an effective material to increase the product ΔR·A of a CPP-GMR magnetic sensor, ΔR being the change in resistance and A being the element area of the magnetic sensor. More preferably, the free magnetic layer 25 is formed of a metal compound having a composition represented by $CO_2MnZ$. In this case, Z is at least one element selected from the group consisting of Al, Ga, Si, Ge, Sn, In, Sb, Pb, and Zn.

In addition, a track width Tw is determined by the width dimension of the free magnetic layer 25 in the track width direction (X direction in the figure).

The protective layer 26 is formed of Ta or Ru and suppresses the progress of oxidation of the multilayer film T4. The thickness of the protective layer 26 is in the range of 10 to 50 Å.

In the embodiment shown in FIG. 4, at each of two sides of the multilayer film T4 formed of the layers from the seed layer 21 to the protective layer 26, an insulating layer 27, a hard bias layer 28, and an insulating layer 29 are laminated in that order from the bottom. By a longitudinal bias magnetic field from the hard bias layers 28, the magnetization of the free magnetic layer 25 is aligned in the track width direction (X direction in the figure).

A bias underlayer (not shown) may be formed between the insulating layer 27 and the hard bias layer 28. The bias underlayer is formed, for example, of Cr, W, a W—Ti alloy, or a Fe—Cr alloy.

The insulating layers 27 and 29 are formed of an insulating material such as $Al_2O_3$ or $SiO_2$ and insulate the top and the bottom of the hard bias layer 28 in order to prevent current flowing through the multilayer film T4 in a direction perpendicular to the surfaces of the layers thereof from being shunt to the two sides of the multilayer film T4 in the track width direction.

The hard bias layers 28 are formed, for example, of a Co—Pt alloy or a Co—Cr—Pt alloy.

Over the insulating layers 29 and the protective layer 26 and under the seed layer 21, the electrode layers 20 formed of a conductive material such as Cu are provided. The structure of the magnetic sensor shown in FIG. 4 is a CPP type and functions as a current source for supplying current in a direction perpendicular to the surfaces of the layers forming the multilayer film T4.

The magnetization of the free magnetic layer 25 is aligned in the track width direction (X direction in the figure) by the longitudinal bias magnetic field from the hard bias layers 28 and is sensitively changed with respect to a signal magnetic field (exterior magnetic field) from a recording medium. On the other hand, the magnetization of the pinned magnetic layer 23 is pined in the height direction (Y direction in the figure) by its own uniaxial anisotropy.

By the relationship between the change in magnetization direction of the free magnetic layer 25 and the pinned magnetization direction of the pinned magnetic layer 23 (in particular, the pinned magnetization direction of the second magnetic layer 23c), the electric resistance is changed, and by the change in voltage or the change in current caused by the change in electric resistance described above, a leakage magnetic field from a recording medium is detected.

Next, characteristic portions of this embodiment will be described.

The magnetic layer 23c of the pinned magnetic layer 23 has a three-layered structure formed of the CoFe layer 23c1, the $Ni_aFe_b$ alloy layer 23c2 (where a and b each indicate atomic percent, and $0<a\leq25$ and $a+b=100$ are satisfied), and the CoFe layer 23c3 laminated in that order from the bottom.

According to this embodiment, the content of Ni in the NiFe alloy forming the $Ni_aFe_b$ alloy layer 23c2 is set small, such as in the range of more than 0 to 25 atomic percent. When the content of Ni in the NiFe alloy is in the range as described above, the product $\Delta R \cdot A$ of the change in resistance and the element area of the magnetic sensor can be increased as compared to that of a related magnetic sensor. In addition, when the content of Ni in the NiFe alloy is in the range described above, the magnetostrictive constant of the pinned magnetic layer 23 can be increased, and as a result, the uniaxial anisotropy thereof can be increased; hence, the magnetization direction of the pinned magnetic layer 23 can be reliably pinned in one direction. That is, reproduction output of the magnetic sensor is increased, and in addition, the asymmetry of production output depending on an application direction of an exterior magnetic field can be reduced.

In addition, the $Ni_aFe_b$ alloy layer 23c2 is preferably formed of a $Ni_aFe_b$ alloy (where a and b each indicate atomic percent, and $4\leq a\leq23$ and $a+b=100$ are satisfied) and is more preferably formed of a $Ni_aFe_b$ alloy (where a and b each indicate atomic percent, and $15\leq a\leq20$ and $a+b=100$ are satisfied). The CoFe layers 23c1 and 23c3 formed on the top and the bottom of the $Ni_aFe_b$ alloy layer 23c2 are provided in order to prevent the diffusion of the NiFe alloy. In the case of the single spin valve GMR magnetic sensor shown in FIG. 4, when the CoFe layer 23c3 in contact with the nonmagnetic material layer 24 is only provided, the diffusion of the NiFe alloy to the nonmagnetic material layer 24 can be effectively prevented. In addition, a single layer structure may be formed only by the $Ni_aFe_b$ alloy layer 23c2 without the CoFe layers 23c1 and 23c3.

In addition, a thickness t6 of the $Ni_aFe_b$ alloy layer 23c2 is preferably in the range of 15 to 50 Å, and a thickness t7 of the CoFe layer 23c1 and a thickness t8 of the CoFe layer 23c3 are preferably in the range of 5 to 15 Å.

EXAMPLE 1.

The product $\Delta R \cdot A$ of the change $\Delta R$ in magnetic resistance and the element area A of a magnetic sensor and the magnetostrictive constant $\lambda s$ of second pinned magnetic layers were investigated. For this investigation, a dual spin valve magnetic sensor having a film structure shown below was formed, and the content of Ni on an atomic percent basis in a $Ni_aFe_b$ alloy (where a and b each indicate atomic percent, and $a+b=100$ is satisfied) is changed, the $Ni_aFe_b$ alloy being an alloy forming the second pinned magnetic layers (corresponding to the magnetic layers 31c and 32a in FIG. 2). The measurement result of the product $\Delta R \cdot A$ and that of the magnetostrictive constant $\lambda s$ are shown in FIGS. 5 and 6, respectively.

The film structure contained a substrate, underlayer Ta (30 Å), seed layer NiFeCr (50 Å), antiferromagnetic layer IrMn (70 Å), pinned magnetic layer (first pinned magnetic layer $Co_{70}Fe_{30}$ (30 Å)), nonmagnetic interlayer Ru (9.1 Å), second pinned magnetic layer CoFe (10 Å), $Ni_aFe_b$ (35 Å), CoFe (5 Å), nonmagnetic material layer Cu (43 Å), free magnetic layer $Co_2MnGe$ (80 Å), nonmagnetic material layer Cu (43 Å), second pinned magnetic layer CoFe (5 Å), $Ni_aFe_b$ (35 Å), CoFe (10 Å), nonmagnetic interlayer Ru (9.1 Å), first pinned magnetic layer ($Co_{70}Fe_{30}$ (30 Å)), antiferromagnetic layer IrMn (70 Å), and protective layer Ta (200 Å), and the values shown in the parentheses indicate the thicknesses.

Figure 5:
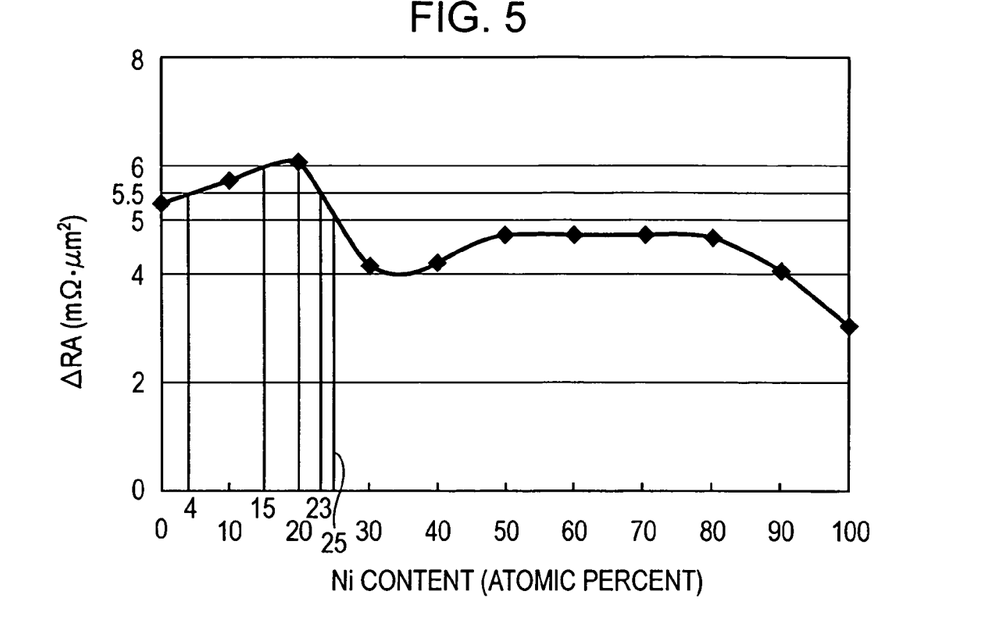
FIG. 5 is a graph showing the relationship between a product $\Delta R \cdot A$ of a change $\Delta R$ in resistance and an element area A of a magnetic sensor and the content of Ni in a $Ni_a Fe_b$ alloy layer (where a and b each indicate atomic percent, and a+b=100 is satisfied), the magnetic sensor being a dual spin valve magnetic sensor having pinned magnetic layers, each of which includes the above $Ni_a Fe_b$ alloy layer.
Figure 6:
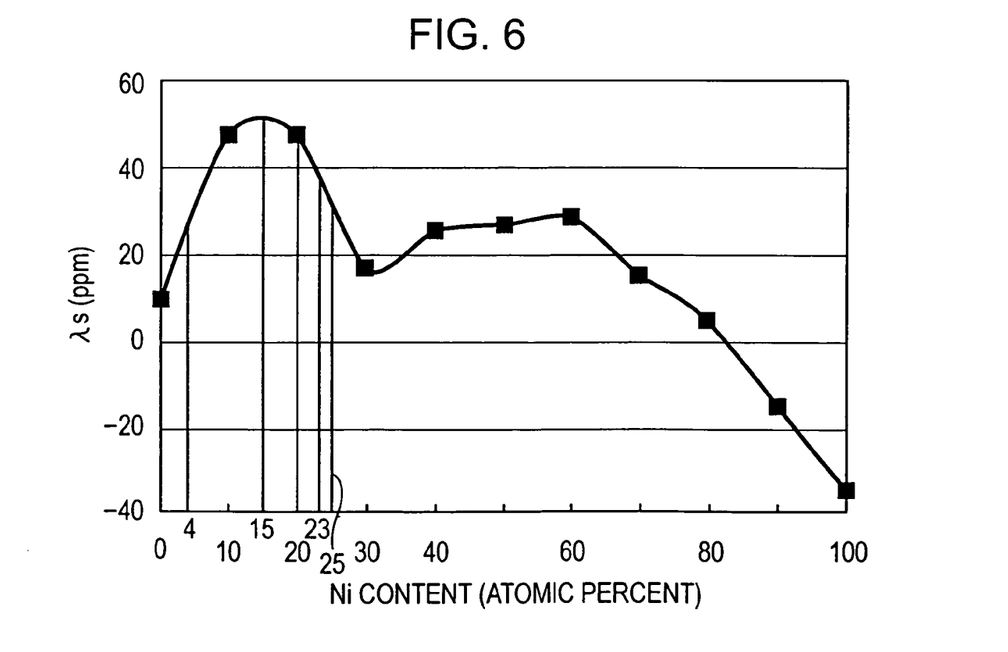
FIG. 6 is a graph showing the relationship between a magnetostrictive constant $\lambda s$ of a pinned magnetic layer of a magnetic sensor and the content of Ni in a $Ni_a Fe_b$ alloy layer (where a and b each indicate atomic percent, and a+b=100 is satisfied) forming the pinned magnetic layers, the magnetic sensor being a dual spin valve magnetic sensor.

As shown in FIG. 5, when a Ni content a in the $Ni_aF_b$ alloy layer (where a and b each indicate atomic percent, and $a+b=100$ is satisfied) forming the pinned magnetic layer is in the range of more than 0 to 25 atomic percent, the product $\Delta R \cdot A$ of the magnetic sensor is 5 mΩ·μm² or more. On the other hand, when the Ni content a is in the range of 40 to 80 atomic percent as is the case in the past, the product $\Delta R \cdot A$ of the magnetic sensor is less than 5 mΩ·μm².

In addition, when the Ni content a is in the range of 4 to 23 atomic percent, the product $\Delta R \cdot A$ of the magnetic sensor is 5.5 mΩ·μm² or more, and when the Ni content a is in the range of 15 to 20 atomic percent, the product $\Delta R \cdot A$ of the magnetic sensor is 6 mΩ·μm² or more.

Hence, the present invention is characterized in that the pinned magnetic layer has a $Ni_aFe_b$ alloy layer (where a and b each indicate atomic percent, and $0<a\leq25$ and $a+b=100$ are satisfied). In addition, the pinned magnetic layer preferably has a $Ni_aFe_b$ alloy layer (where a and b each indicate atomic percent, and $4\leq a\leq23$ and $a+b=100$ are satisfied) and more preferably has a $Ni_aFe_b$ alloy layer (where a and b each indicate atomic percent, and $15\leq a\leq20$ and $a+b=100$ are satisfied).

As shown in FIG. 6, in the composition range of the above $Ni_aFe_b$ alloy layer according to the present invention, the magnetostrictive constant $\lambda s$ of the pinned magnetic layer is increased. In particular, when the Ni content a in the $Ni_aFe_b$ alloy layer is in the range of 4 to 23 atomic percent, the magnetostrictive constant $\lambda s$ is increased as compared to that obtained when the Ni content a in the $Ni_aFe_b$ alloy layer is in the range in the past, such as 40 to 80 atomic percent.

When the magnetostrictive constant $\lambda s$ is increased, a magnetization pinning force of the pinned magnetic layer is increased owing to the shape anisotropy. Accordingly, since the magnetostrictive constant $\lambda s$ of the pinned magnetic layer is increased, in particular, the present invention is effectively applied to a self-pinned magnetic sensor as shown in FIG. 4.

What is claimed is:
1. A magnetic sensor comprising: a multilayer film which has a pinned magnetic layer, the magnetization thereof being pinned in one direction, and a free magnetic layer formed on the pinned magnetic layer with a nonmagnetic material layer provided therebetween, in which current is allowed to flow in a direction perpendicular to the surfaces of the layers forming the multilayer film,
   wherein the pinned magnetic layer has a $Ni_aFe_b$ alloy layer (where a and b each indicate atomic percent, and $0<a\leq25$ and $a+b=100$ are satisfied).

2. The magnetic sensor according to claim 1, wherein the pinned magnetic layer has a $Ni_aFe_b$ alloy layer (where a and b each indicate atomic percent, and $4 \leq a \leq 23$ and $a+b=100$ are satisfied).

3. The magnetic sensor according to claim 2, wherein the pinned magnetic layer has a $Ni_aFe_b$ alloy layer (where a and b each indicate atomic percent, and $15 \leq a \leq 20$ and $a+b=100$ are satisfied).

4. The magnetic sensor according to claim 1, wherein the pinned magnetic layer has a three-layered structure composed of two CoFe layers provided on the top and the bottom of the $Ni_aFe_b$ alloy layer.

5. The magnetic sensor according to claim 1, wherein a product $\Delta R \cdot A$ is 5 $m\Omega \cdot \mu m^2$ or more, $\Delta R$ being the change in resistance and A being an element area.

6. The magnetic sensor according to claim 1, wherein the free magnetic layer has a $Co_2YZ$ alloy layer (where Y indicates at least one element selected from the group consisting of Mn, Fe, and Cr, and Z indicates at least one element selected from the group consisting of Al, Ga, Si, Ge, Sn, In, Sb, Pb, and Zn).

7. The magnetic sensor according to claim 1, wherein the pinned magnetic layer is provided at an upper side of the free magnetic layer.

8. The magnetic sensor according to claim 1, wherein the pinned magnetic layer is provided at a lower side of the free magnetic layer.

9. The magnetic sensor according to claim 1, wherein the nonmagnetic material layer and the pinned magnetic layer are provided under the free magnetic layer, further comprising a nonmagnetic material layer and a pinned magnetic layer on the free magnetic layer.

10. The magnetic sensor according to claim 7, wherein the magnetization of the pinned magnetic layer is pinned in one direction by uniaxial anisotropy thereof.

11. The magnetic sensor according to claim 7, further comprising an antiferromagnetic layer which is provided on the pinned layer.

12. The magnetic sensor according to claim 4, wherein the $Ni_aFe_b$ alloy layer has a thickness equal to or greater than a thickness of at least one of the two CoFe layers.

13. The magnetic sensor according to claim 4, wherein the $Ni_aFe_b$ alloy layer has a thickness of 15 Å to 50 Å, and at least one of the two CoFe layers has a thickness of 5 Å to 15 Å.

14. The magnetic sensor according to claim 1, wherein the pinned magnetic layer has an artificial ferrimagnetic coupling structure composed of a first magnetic layer, a second magnetic layer, and a nonmagnetic interlayer provided therebetween, wherein the second magnetic layer is provided at a side closer to the free magnetic layer.

* * * * *